(12) United States Patent
McRae

(10) Patent No.: US 12,187,243 B2
(45) Date of Patent: Jan. 7, 2025

(54) TRACTOR TRAILER COMPRESSED AIR SYSTEM AND ACCESSORIES FOR USE THEREWITH

(71) Applicant: Cecil Kenneth McRae, Beamsville (CA)

(72) Inventor: Cecil Kenneth McRae, Beamsville (CA)

(*) Notice: Subject to any disclaimer, the term of this patent is extended or adjusted under 35 U.S.C. 154(b) by 470 days.

(21) Appl. No.: 17/521,938

(22) Filed: Nov. 9, 2021

(65) Prior Publication Data

US 2023/0144472 A1  May 11, 2023

(51) Int. Cl.
*B60S 1/62* (2006.01)
*B60D 1/62* (2006.01)

(52) U.S. Cl.
CPC . *B60S 1/62* (2013.01); *B60D 1/62* (2013.01)

(58) Field of Classification Search
CPC ..... B60S 1/62; B60D 1/62; B60D 1/64; B60P 3/2265; B60R 15/02; B65H 75/362; B65H 75/403; B65H 75/425; B65H 75/4402; E02F 9/2275
USPC .................................................. 137/355.12
See application file for complete search history.

(56) References Cited

U.S. PATENT DOCUMENTS

| | | | |
|---|---|---|---|
| 2,704,989 A | 3/1955 | Konecny | |
| 3,219,275 A | 11/1965 | Green | |
| 3,613,915 A | 10/1971 | Vita | |
| 4,311,165 A * | 1/1982 | Rose, Jr. ............ | B65H 75/4428 137/355.12 |
| 5,179,972 A * | 1/1993 | Eley .................... | B65H 75/4478 137/355.19 |
| 5,303,866 A * | 4/1994 | Hawks, Jr. ......... | B65H 75/4471 137/355.27 |
| 5,466,104 A * | 11/1995 | Gatwood ............ | B60P 7/16 410/125 |

(Continued)

FOREIGN PATENT DOCUMENTS

| | | |
|---|---|---|
| CN | 103629113 A | 3/2014 |
| GB | 2384471 A | 7/2003 |

(Continued)

OTHER PUBLICATIONS

Article 19 Amendment as filed with the International Bureau of WIPO on Mar. 23, 2023 in PCT/CA2022/051542, 9 pages.

(Continued)

*Primary Examiner* — Kelsey E Cary
(74) *Attorney, Agent, or Firm* — Thompson Patent Law Offices PC

(57) ABSTRACT

The tractor trailer compressed air system with accessories is a mechanical device. The tractor trailer compressed air system with accessories incorporates a housing, an air transport structure, a tractor, and a trailer. The housing contains the air transport structure. The housing mounts on the trailer. The trailer attaches to the tractor. The trailer forms a fluidic connection with the tractor. The trailer forms a fluidic connection with the air transport structure. The tractor transfers compressed air to the trailer. The trailer transfers a portion of the received compressed air to the air transport structure. The air transport structure releases the compressed air as an air flow into the atmosphere. The released air flow is used to blow detritus off of and out of the tractor and the trailer.

15 Claims, 5 Drawing Sheets

(56) References Cited

U.S. PATENT DOCUMENTS

| | | | | |
|---|---|---|---|---|
| 5,566,898 | A * | 10/1996 | Cline | B65H 75/4402 |
| | | | | 242/379 |
| 5,816,499 | A * | 10/1998 | Christiansen | B08B 3/026 |
| | | | | 242/395 |
| 6,457,921 | B1 | 10/2002 | Freeman | |
| 6,926,027 | B1 * | 8/2005 | Sorensen | B65H 75/425 |
| | | | | 137/355.23 |
| 7,240,911 | B1 | 7/2007 | Escalante | |
| 7,344,145 | B2 | 3/2008 | Duchet et al. | |
| 8,276,831 | B2 | 10/2012 | Rutherford | |
| 8,727,084 | B1 * | 5/2014 | Kuker | B65H 75/425 |
| | | | | 242/378.2 |
| 9,254,828 | B2 | 2/2016 | Simpson | |
| 2007/0063582 | A1 | 3/2007 | Bryar | |
| 2008/0295894 | A1 * | 12/2008 | Uffner | B65H 75/4478 |
| | | | | 137/355.27 |
| 2020/0096128 | A1 | 3/2020 | Cervantez et al. | |
| 2022/0281396 | A1 | 9/2022 | Pearson et al. | |

FOREIGN PATENT DOCUMENTS

| | | |
|---|---|---|
| WO | 2005056352 A1 | 6/2005 |
| WO | 2023081994 A1 | 5/2023 |

OTHER PUBLICATIONS

AVS "2-Gallon Aluminum Tank—Raw" Accessed from the Internet May 6, 2024.

International Search Report and Written Opinion of the International Searching Authority in related International Application No. PCT/CA2022/051542, dated Jan. 27, 2023, 6 pages.

Pro-Syrian Democratic Forces Sdf "This object is a fuel tank, not a ballistic missile" Accessed from the Internet May 6, 2024.

Specialty Suspension, "Seamless Tanks Aluminum Air Tank 28" Length 5.562, Accessed from the Internet May 6, 2024.

Trailer Marketing, Inc., Webpage, "Air Tank for Dual Tank System" Accessed from the Internet on May 8, 2024.

Transport Resources, Inc., Website, "Pneumatic Tank Trailers for Lease" Accessed from the Internet on May 8, 2024.

* cited by examiner

TRACTOR TRAILER COMPRESSED AIR SYSTEM AND ACCESSORIES FOR USE THEREWITH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fittings for supporting a vehicle. (B60S9/00)

SUMMARY OF INVENTION

The tractor trailer compressed air cleaning system with accessories is a mechanical device. The tractor trailer compressed air system with accessories comprises a housing, an air transport structure, a tractor, and a trailer. The housing contains the air transport structure. The housing mounts on the trailer. The trailer attaches to the tractor. The trailer forms a fluidic connection with the tractor. The trailer forms a fluidic connection with the air transport structure. The tractor transfers compressed air to the trailer. The trailer transfers a portion of the received compressed air to the air transport structure. The air transport structure releases the compressed air as an air flow into the atmosphere in order to clean out the trailer with compressed air. The released air flow is used to blow detritus off of and out of the tractor and the trailer.

These together with additional objects, features and advantages of the tractor trailer compressed air system will be readily apparent to those of ordinary skill in the art upon reading the following detailed description of the presently preferred, but nonetheless illustrative, embodiments when taken in conjunction with the accompanying drawings.

In this respect, before explaining the current embodiments of the tractor trailer compressed air system in detail, it is to be understood that the tractor trailer compressed air system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tractor trailer compressed air system.

It is therefore important that the claims be regarded as including such equivalent construction insofar as they do not depart from the spirit and scope of the tractor trailer compressed air system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
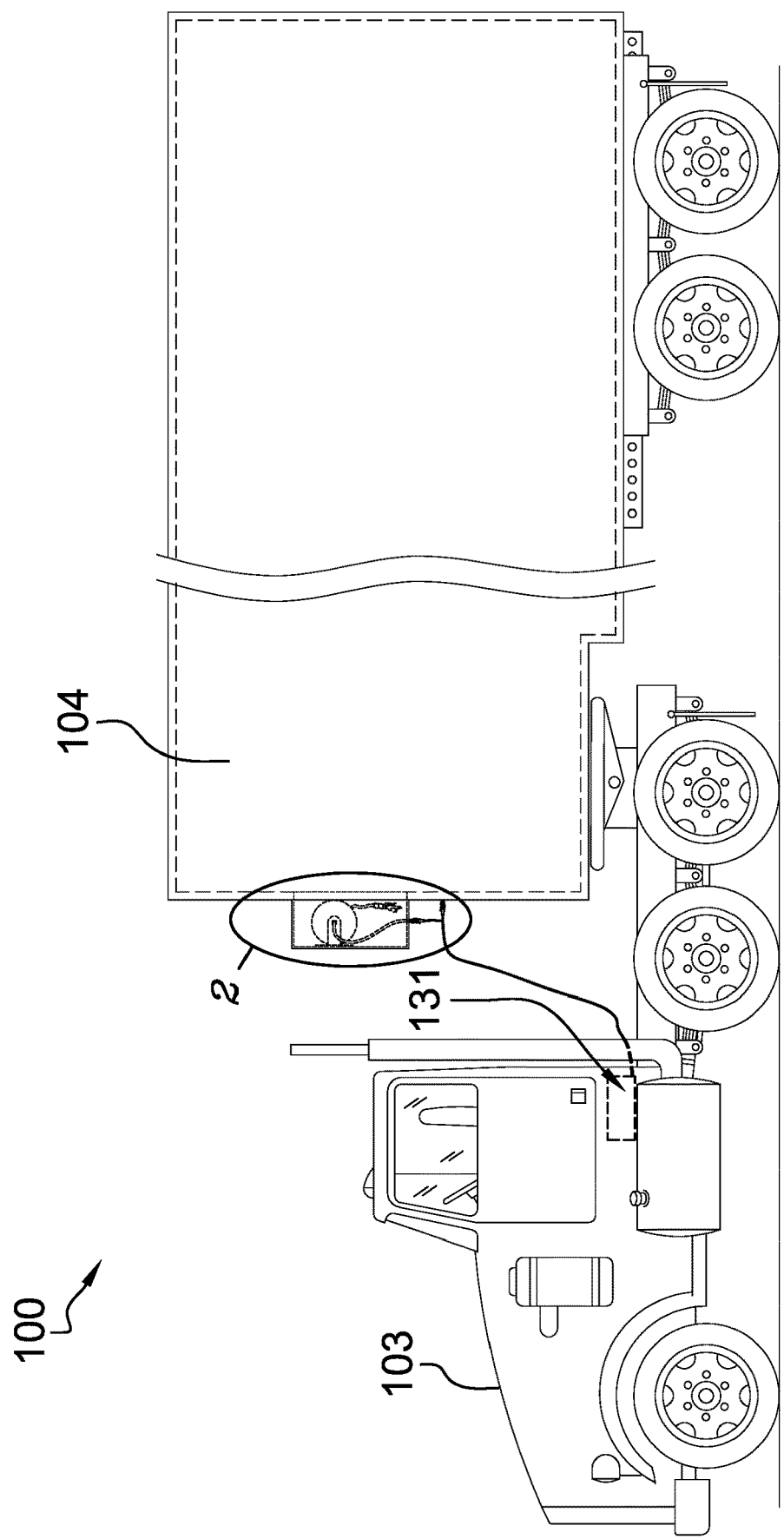
FIG. 1 is an in-use view of an embodiment of the disclosure.
Figure 2:
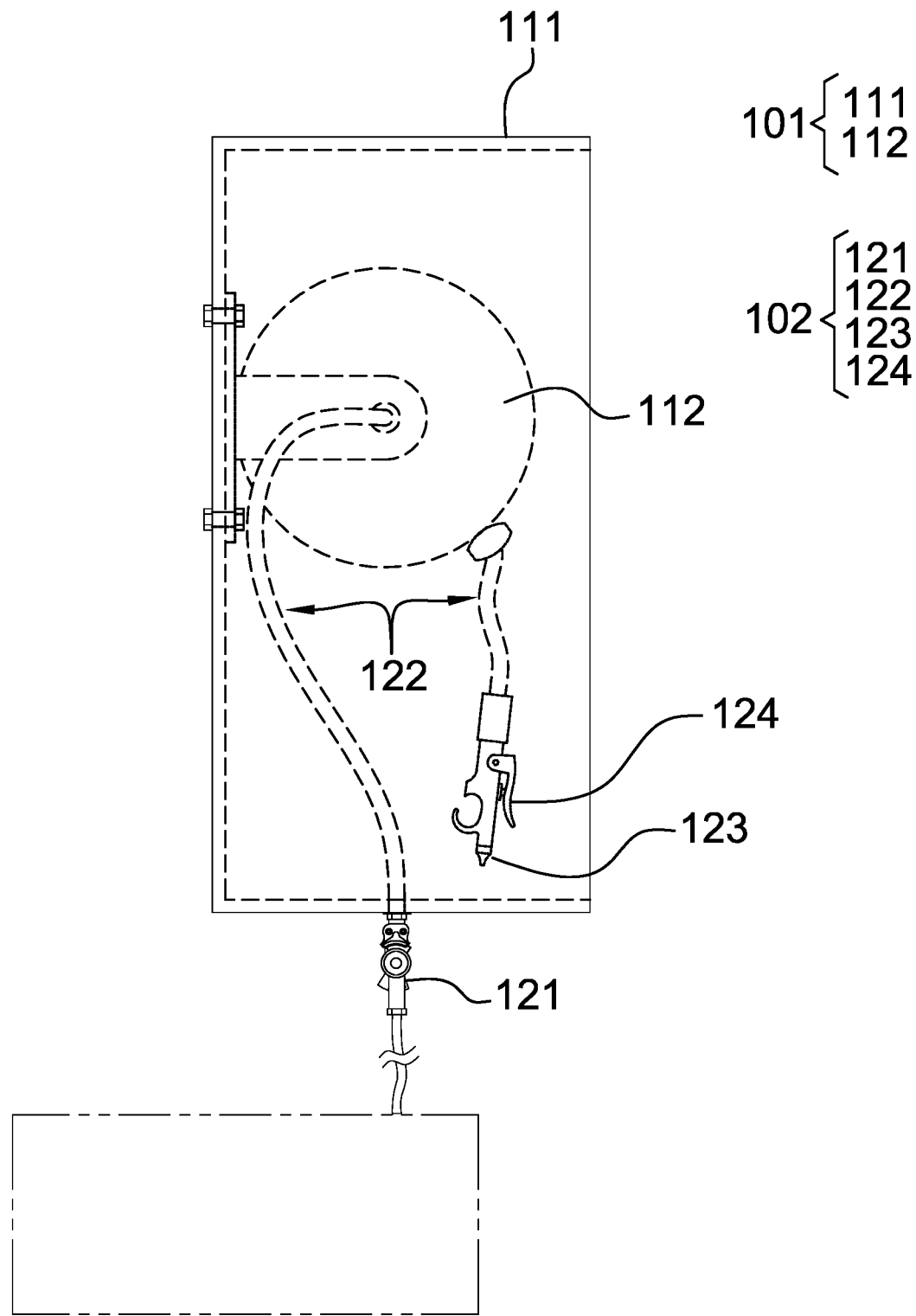
FIG. 2 is a front view of an embodiment of the disclosure.
Figure 3:
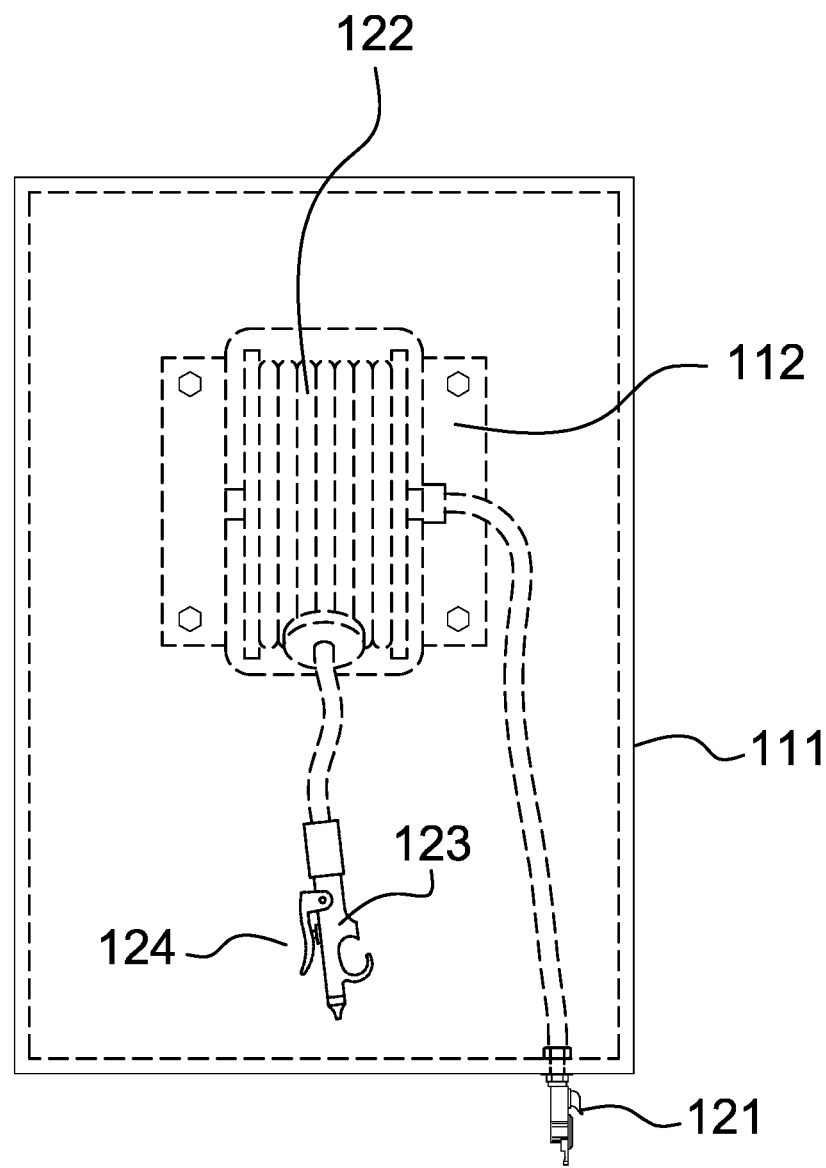
FIG. 3 is a side view of an embodiment of the disclosure.
Figure 4:
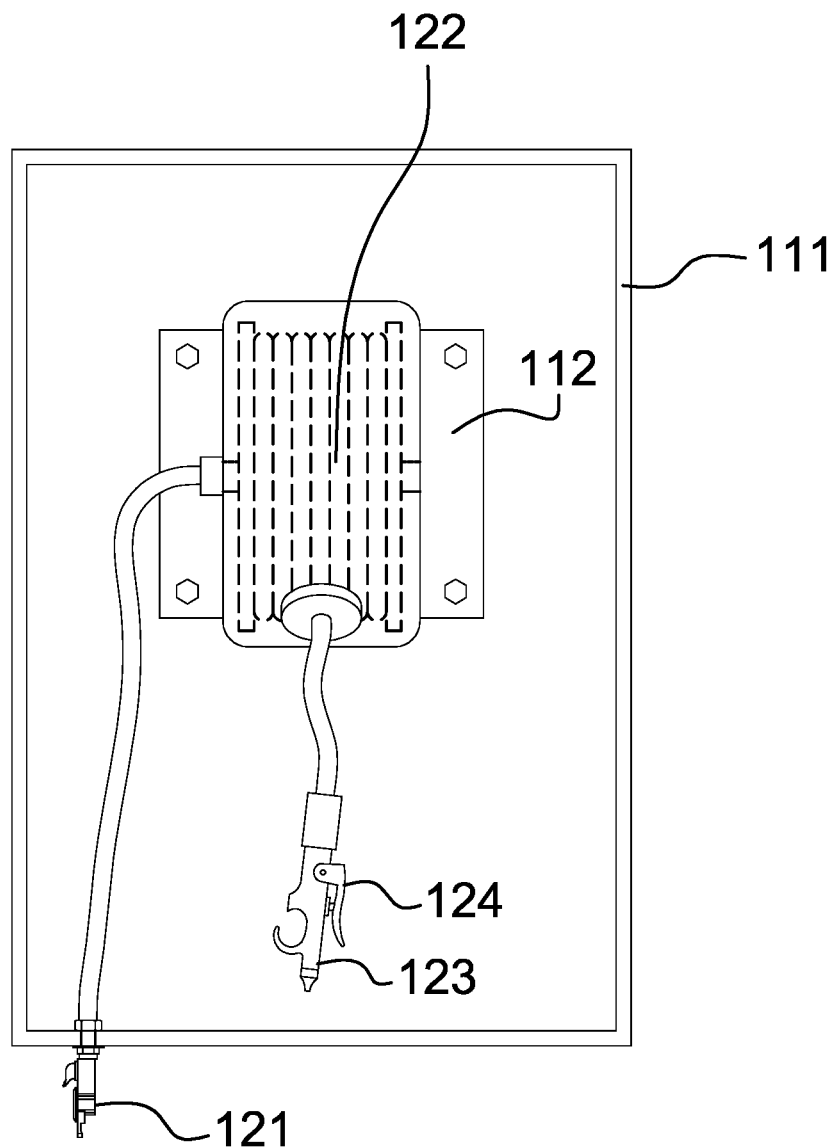
FIG. 4 is a reverse side view of an embodiment of the disclosure.
Figure 5:
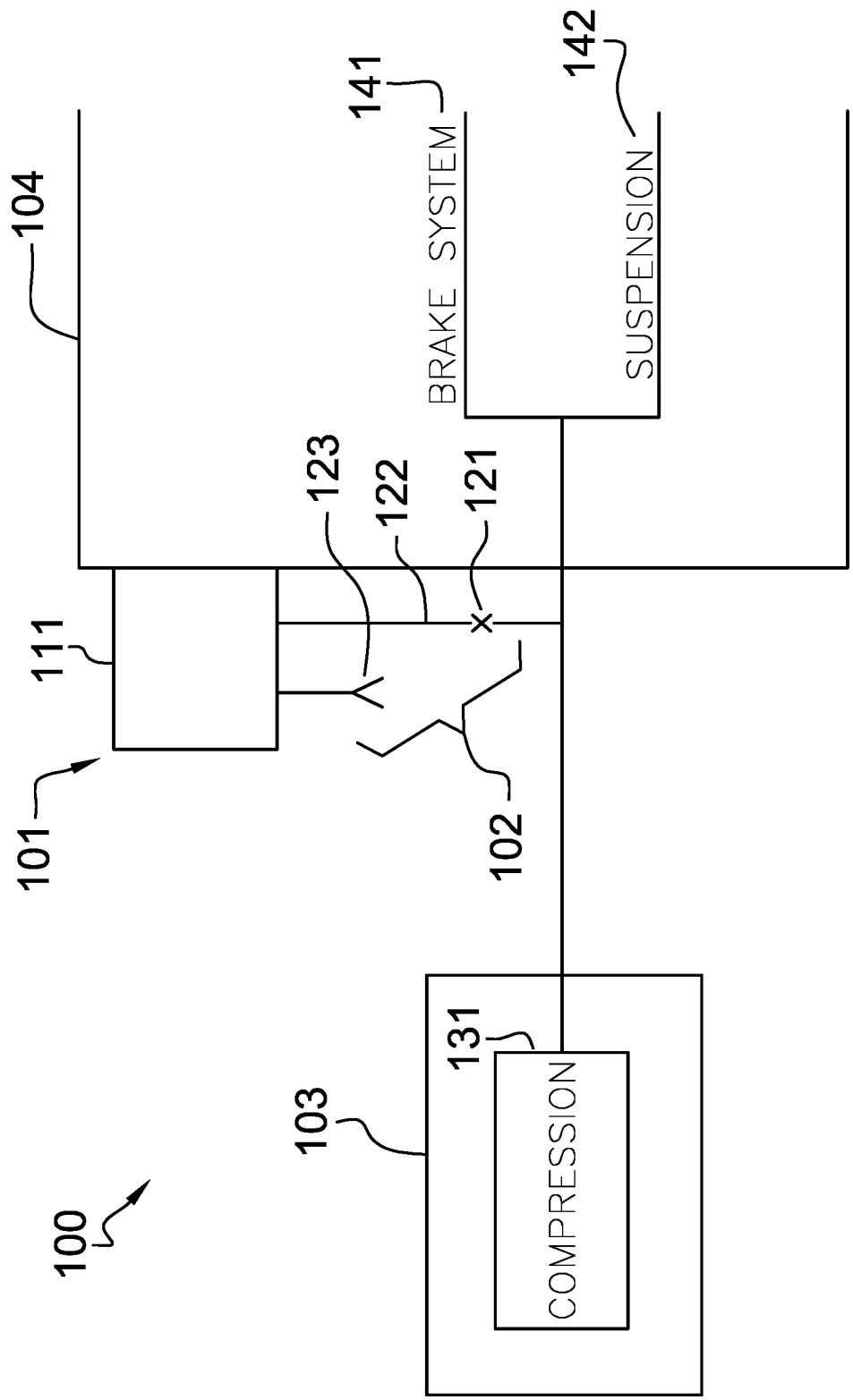
FIG. 5 is a schematic view of an embodiment of the disclosure.

Detailed reference will now be made to one or more potential embodiments of the disclosure, which are illustrated in FIGS. 1 through 5.

The tractor trailer compressed air system with accessories 100 (hereinafter invention) is a mechanical device. The invention 100 comprises a housing 101, an air transport structure 102, a tractor 103, and a trailer 104. The housing contains the air transport structure 102. The housing 101 mounts on the trailer 104. The trailer 104 attaches to the tractor 103. The trailer 104 forms a fluidic connection with the tractor 103. The trailer 104 forms a fluidic connection with the air transport structure 102. The tractor 103 transfers compressed air to the trailer 104. The trailer 104 transfers a portion of the received compressed air to the air transport structure 102. The air transport structure 102 releases the compressed air as an air flow into the atmosphere. The released air flow is used to blow detritus off of and out of the tractor 103 and the trailer 104.

The tractor 103 is a motorized vehicle. The tractor 103 attaches to the trailer 104. The tractor 103 provides the motive forces necessary to tow the trailer 104. The tractor 103 is defined elsewhere in this disclosure. The tractor 103 further comprises an on-board compressor 131.

The on-board compressor 131 is a mechanical device. The on-board compressor 131 is the source of compressed air for the trailer 104. The on-board compressor 131 draws air from the atmosphere. The on-board compressor 131 is a pump that creates a pressure differential that increases the pressure of the drawn air to form the compressed air. A portion of the compressed air generated by the on-board compressor 131 supports the mechanical operation of the tractor 103. The on-board compressor 131 forms a fluidic connection with the trailer 104 that transfers a portion of the generated compressed air to the trailer 104.

The trailer 104 is an unpowered vehicle. The trailer 104 stores and transports cargo. The trailer 104 attaches to the tractor 103. The trailer 104 is defined elsewhere in this disclosure. The trailer 104 further comprises a trailer 104 brake system 141 and a trailer 104 suspension system 142.

The trailer 104 brake system 141 is a mechanical structure. The trailer 104 brake system 141 forms a brake used to stop the motion of the trailer 104. The trailer 104 brake system 141 is powered by the compressed air. The trailer 104 brake system 141 uses the compressed air received from the on-board compressor 131 of the tractor 103 to stop the motion of the trailer 104. The trailer 104 suspension system 142 is a suspension. The suspension is defined elsewhere in this disclosure. The trailer 104 suspension system 142 is operated using the compressed air.

The housing 101 is a rigid structure. The housing 101 contains the air transport structure 102. The housing 101 is formed with all apertures and form factors necessary to allow the housing 101 to accommodate the use and operation of the air transport structure 102. Methods to form a housing 101 suitable for the purposes described in this disclosure are well-known and documented in the mechanical arts. The housing 101 comprises a shell 111 and a roller clutch and spring system 112.

The shell 111 is a rigid structure. The shell 111 contains the roller clutch and spring system 112. The shell 111 is formed with all apertures and form factors necessary to allow the shell 111 to accommodate the use and operation of the roller clutch and spring system 112. Methods to form a shell 111 suitable for the purposes described in this disclosure are well-known and documented in the mechanical arts.

The roller clutch and spring system 112 is a mechanical device. The roller clutch and spring system 112 stores the hose of the air transport structure 102 as a spool. The roller clutch and spring system 112 deploys the hose 122 for use in blowing detritus from the trailer 104 and the tractor 103. The roller clutch and spring system 112 automatically retracts the hose 122 back onto the spool for storage. The roller clutch and spring system 112 is defined elsewhere in this disclosure.

The air transport structure 102 is a fluid network. The air transport structure 102 forms a fluidic connection with the trailer 104. The air transport structure 102 receives compressed air from the trailer 104. The air transport structure 102 releases the received compressed air as a directed air flow into the atmosphere. The directed flow of compressed air released by the air transport structure 102 generates the motive forces used to blow detritus off of and away from the trailer 104 and the tractor 103. The air transport structure 102 comprises a master valve 121, a hose 122, and a nozzle 123.

The master valve 121 is a fitting. The master valve 121 forms a fluidic connection between the trailer 104 and the hose 122. The master valve 121 transports a portion of the compressed air received by the trailer 104 from the tractor 103 to the hose 122. The master valve 121 controls the flow of compressed air into the air transport structure 102. In an open position, the master valve 121 enables the operation of the air transport structure 102 by allowing the compressed air to flow through the air transport structure 102 to generate the directed air flow. In a closed position, the master valve 121 disables the operation of the air transport structure 102 by preventing the flow of compressed air into the air transport structure 102.

The hose 122 is a fluid transport structure. The hose 122 is a flexible structure. The hose 122 is a tubular structure. The hose 122 transports the compressed air received from the master valve 121 to the nozzle 123. The hose 122 is stored in the roller clutch and spring system 112 of the housing 101. The hose 122 is deployed from the roller clutch and spring system 112. The hose 122 automatically retracts into the roller clutch and spring system 112.

The nozzle 123 is a fitting that attaches to the hose 122. The nozzle 123 receives the compressed air from the hose 122 and releases the compressed air into the atmosphere as the directed air flow. The nozzle 123 further comprises a nozzle 123 valve 124. The nozzle 123 valve 124 is a valve that is associated with the nozzle 123. The nozzle 123 valve 124 controls the flow of the compressed air out of the nozzle 123. In an open position, the nozzle 123 valve 124 allows the release of the directed air flow of compressed air from the nozzle 123. In a closed position, the nozzle 123 valve 124 prevents the release of the directed air flow from the nozzle 123.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Brake: As used in this disclosure, a brake is a device that is used to slow or stop the motion of a machine or a vehicle.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chassis: As used in this disclosure, a chassis is a wheeled structure that is used to transport an attached load.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Clutch: As used in this disclosure, a clutch is a mechanical device that attaches and detaches a first rotating device to and from a second device that provides the energy required to rotate the first rotating device.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Compress: In this disclosure, compress means to apply a forces to force a fixed mass of material into a smaller volume of space.

Compressed Air: In this disclosure, compressed air means atmospheric gases that has been compressed to a pressure greater than normal temperature and pressure.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord.

Correspond: As used in this disclosure, the term correspond is used as a comparison between two or more objects wherein one or more properties shared by the two or more objects match, agree, or align within acceptable manufacturing tolerances.

Detritus: As used in this disclosure, detritus refers to an accumulation of unwanted material on a surface.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

Fitting: As used in this disclosure, a fitting is a component that attaches a first object to one or more additional objects. The fitting is often used to forming a fluidic connection between the first object and the one or more additional objects.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Housing: As used in this disclosure, a housing is a rigid structure that encloses and protects one or more devices.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Negative Space: As used in this disclosure, negative space is a method of defining an object through the use of open or empty space as the definition of the object itself, or, through the use of open or empty space to describe the boundaries of an object.

Nozzle: As used in this disclosure, a nozzle is a device that receives fluid under pressure and releases the fluid in a controlled manner into an environment.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Plasma: As used in this disclosure, plasma refers to a state (phase) of matter wherein the outer valence electrons of an atom (or molecule) have been separated from their nucleus but remain with the matter. A plasma is an electrically neutral state of matter that is formed from the ions of the separated atoms. Plasmas generally, but not necessarily behaves like a gas in that a plasma fills the volume of the structure that contains it. The flow of a plasma through the atmosphere is called an arc. An arc is generally created when the atmosphere is subjected to an electric field that ionizes the molecules forming the atmosphere.

Pressure: As used in this disclosure, pressure refers to a measure of force per unit area.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Roll: As used in this disclosure, the term roll refers to the rotation of an object around an axis or center of rotation.

Roll: As used in this disclosure, a roll is a method of storing a cord as a cylindrical structure such that creases are not formed within the cord. To form the roll, the cord is curved over itself around a center axis such that a spiral is formed when the roll is viewed from the end of the cylindrical structure.

Roller Clutch and Spring System: As used in this disclosure, a roller clutch and spring system is a commercially available system for storing a sheeting on a scroll or loading a cord on a spool. The sheeting is stored on a rotating cylindrical roller as the scroll. The cord is stored on the spool. The clutch portion of the roller clutch and spring system is configured to allow the rotating cylindrical roller to rotate in a first direction. The spring portion of the roller clutch and spring system is configured to return the rotating cylindrical roller to its original position when the clutch portion is released. A common example of the roller clutch and spring system is the mechanism used to raise and lower window blinds. Always use scroll cord spool clutch.

Shell: As used in this disclosure, a shell is a structure that forms an outer covering intended to contain an object. Shells are often, but not necessarily, rigid or semi-rigid structures that are intended to protect the object contained within it.

Solid: As used in this disclosure, a solid refers to a state (phase) of matter that: 1) has a fixed volume; and, 2) does not flow.

Spool: As used in this disclosure, a spool is a cylindrical device upon which a flexible material, including but not limited to a sheeting, yarn, a cord, or a tape, can be wound. Depending on context, a spool may also contain the flexible material stored upon the spool.

Suspension: As used in this disclosure, a suspension is a mechanical system that mounts on the chassis of the vehicle. The suspension forms an isolating structure that absorbs the transfer of transient forces between the cab (or load carrying structure) of the vehicle and the chassis of the vehicle.

Tow: As used in this disclosure, the term tow is used as a verb that refers to moving an object by pulling on the object with the assistance of an apparatus or device.

Tractor: As used in this disclosure, a tractor is a vehicle having a powerful diesel or gasoline powered engine that is used to tow one or more trailers.

Trailer: As used in this disclosure, a trailer is an unpowered wheeled vehicle that is towed by a powered vehicle such as a tractor. See tongue.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Valve: As used in this disclosure, a valve is a device that is used to control the flow of a fluid (gas or liquid) through a pipe, tube, or hose.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tractor trailer compressed air system configured to blow detritus off of and out of a trailer of the tractor trailer, the tractor trailer compressed air system comprising:
   a trailer;
   a tractor comprising a motorized vehicle configured to tow the trailer;
   an air source mounted to the tractor and containing air compressed to a pressure above atmospheric pressure, the air source fluidly coupled to a brake system and a suspension;
   a housing mounted on the trailer and remote from the air source, the housing containing an air transport structure;
   said air transport structure further comprising a master valve forming a selective fluidic connection with the air source and controlling a flow of compressed air through a hose to a nozzle which receives and releases the flow of compressed air to the atmosphere as a directed flow, whereby detritus is blown off,
   wherein operation of the master valve selectively fluidly isolates the hose and nozzle from the brake system and the suspension.

2. The tractor trailer compressed air system of claim 1, wherein the housing comprises a shell, and a roller clutch and spring system configured to:
   deploy the hose for use in blowing off detritus, and
   retract the hose back onto a spool for storage.

3. The tractor trailer compressed air system of claim 1, wherein the nozzle further comprises a nozzle valve configured to control the flow of the compressed air out of the nozzle.

4. The tractor trailer compressed air system of claim 1, wherein the housing is disposed between the trailer and the tractor.

5. A detritus blowing system comprising:
   a housing configured to be mounted on a trailer, the trailer pulled by a powered vehicle and having an air source fluidly coupled to a brake system and a suspension, the housing containing an air transport structure;
   the air transport structure comprising a master valve forming a selective fluidic connection with an air source, the master valve controlling a flow of compressed air through a hose to a nozzle which receives and releases the flow of compressed air as a directed flow, whereby detritus is displaced by the directed flow,
   wherein operation of the master valve selectively fluidly isolates the hose and nozzle from the brake system and the suspension.

6. The system of claim 5, further comprising the powered vehicle and the trailer.

7. The system of claim 6, further comprising an on-board compressor on the powered vehicle and configured as the air source.

8. The system of claim 6, wherein the powered vehicle comprises a tractor.

9. The system of claim 6, wherein the powered vehicle comprises an electric system.

10. The system of claim 6, wherein the trailer is a box trailer.

11. The system of claim 5, wherein the housing is mounted on an end of the trailer nearest the powered vehicle.

12. The system of claim 5, wherein the housing is mounted between the trailer and the powered vehicle.

13. The system of claim 5, wherein the powered vehicle and the trailer are joined by a fluidic connection.

14. The system of claim 5, wherein the directed flow is discharged such that detritus is blown out of the trailer.

15. The system of claim 5, wherein the housing comprises an opening configured such that, when the housing is mounted to the trailer, the opening faces into the trailer such that the nozzle is accessible from inside the trailer.

* * * * *